No. 692,012. Patented Jan. 28, 1902.
G. E. HEYL-DIA.
COVERING ELECTRIC CONDUCTORS WITH INSULATING MATERIAL.
(Application filed Dec. 17, 1900.)
(No Model.)
FIG. 1.
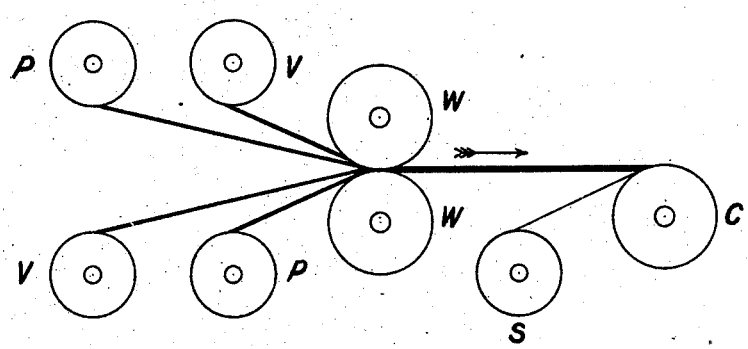
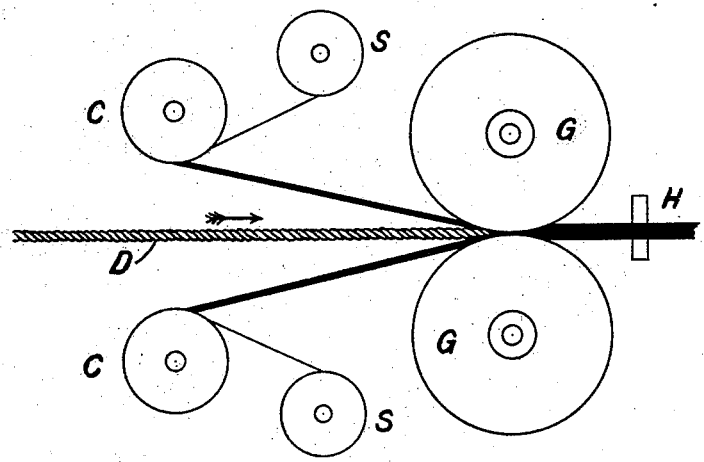 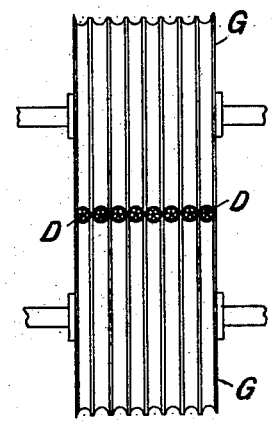
FIG. 2.  FIG. 3.
Witnesses
F. H. Hinman
Peter A. Ross
Inventor
George E. Heyl-Dia
by Henry Connett
Attorney

UNITED STATES PATENT OFFICE.

GEORGE EDWARD HEYL-DIA, OF MANCHESTER, ENGLAND.

COVERING ELECTRIC CONDUCTORS WITH INSULATING MATERIAL.

SPECIFICATION forming part of Letters Patent No. 692,012, dated January 28, 1902.

Application filed December 17, 1900. Serial No. 40,122. (No specimens.)

*To all whom it may concern:*

Be it known that I, GEORGE EDWARD HEYL-DIA, a subject of the Queen of Great Britain, residing in Manchester, in the county of Lancaster, England, (whose post-office address is Birk Crag, 236 Great Clowes street, Higher Broughton, Manchester, aforesaid,) have invented certain new and useful Improvements in Covering Electric Conductors with Insulating Material, of which the following is a specification.

This invention relates to a method of covering electric cables, conductors, or wires with insulating material, and has for its object to do away with the wrapping on of the pure rubber strip as at present practiced.

The accompanying drawings illustrate a means for carrying my invention into practice.

In the drawings, Figure 1 is a side elevation of the device for preparing the materials, and Figs. 2 and 3 are respectively a side and front elevation of the device for applying the prepared material to the conductor.

The invention consists in covering the cables, conductors, or wires with pure rubber and vulcanized rubber in one operation, by coating the vulcanized rubber on one side with pure rubber before applying it to the cable or the like.

One preferred method of coating the vulcanized rubber with the pure rubber consists as follows: The pure rubber and the vulcanized rubber are calendered separately into separate sheets, then the two sheets are passed between warm rollers under pressure in order to make them adhere to one another and to draw out the air from between them. The combined sheet thus made may be stored in any convenient manner. It is preferable to wind it onto a roller with a sheet of cloth between the turns to prevent the whole from sticking together.

By my invention an improved insulating material is provided consisting of composite rubber, which is adapted to be readily applied to electric conductors.

In carrying the invention into effect the vulcanized rubber may be coated with the pure rubber by the aforesaid means or by any convenient or suitable means, and the composite rubber sheet, tape, or strip thus produced is then applied to the wire or other conductor by means of grooved pressure-rollers in the usual way or by any convenient means, the pure rubber side being turned next to the wire. The conductor thus covered may receive another layer or several layers of the composite rubber or ordinary vulcanizing rubber by the same means and at the one operation, if desired. It may also be braided or otherwise further covered in any ordinary or known manner, as may be deemed requisite.

It will be readily understood that other suitable insulating material may be used in place of the vulcanized rubber to receive the coating of pure rubber without departing from the spirit of the invention.

I will now explain the constructions illustrated in the drawings, premising, however, that the present invention is not limited to any specific apparatus or means for carrying it out.

Referring to Fig. 1, which shows the means for producing in a convenient way the composite material, W W designate warm rollers, to which are led strips of pure rubber from drums P and vulcanized or vulcanizing rubber from drums V. These strips are alternated and superimposed and are pressed into a compound strip by the rollers W, this strip having one face of pure rubber. The composite strip is wound onto a drum or roller C, together with a separating-sheet of cloth from a drum or roller S.

Referring to Figs. 2 and 3, G G are grooved rollers for applying the insulating-covering to conductors D, the sheets of the compound or composite material being drawn directly from the receiving-rollers C C, one of which is illustrated in Fig. 1. A plurality of the conductors are covered at one time and afterward cut apart by cutters H. The separating cloth may be rewound on the roller S as the strip of insulating material is drawn from the drum C.

I declare that what I claim is—

1. The herein-described method of covering electric cables, conductors, or wires with insulating material which consists in combining pure rubber and another insulating material such as vulcanized rubber into a single composite material of which one side consists of pure rubber, and in applying the same to the conductor with the pure-rubber side turned toward the wire substantially as hereinbefore set forth.

2. The herein-described method of covering electric cables, conductors, or wires, with insulating material, which consists in taking some insulating material such as vulcanized rubber in sheet or strip form, applying to it a coating of pure rubber, and finally applying the composite material to the conductor with the pure-rubber side turned toward the wire, substantially as and for the purpose set forth.

3. The herein-described method of covering electric cables, conductors, or wires, with insulating material, which consists in separately calendering pure rubber and another insulating material such as vulcanized rubber into separate sheets or strips, then passing the two materials between warm rollers to make them adhere one to the other and to draw out the air from between them, and finally applying the composite material to the conductor with the pure-rubber side turned toward the wire, substantially as hereinbefore set forth.

In witness whereof I have hereunto signed my name, this 4th day of December, 1900, in the presence of two subscribing witnesses.

GEORGE EDWARD HEYL-DIA.

Witnesses:
SIDNEY W. DOD,
HUBERT A. GILL.